United States Patent [19]

Lacroix et al.

[11] Patent Number: 4,851,011

[45] Date of Patent: Jul. 25, 1989

[54] PROCESS FOR THE PREPARATION OF CONCENTRATED AQUEOUS DYE FORMULATIONS OF WATER-SOLUBLE ORGANIC DYES BY MEMBRANE SEPARATION AND WITH CROSS-FLOW MICRO-FILTRATION TO REMOVE SUSPENDED OR COLLOIDAL SOLIDS

[75] Inventors: Roger Lacroix, Village-Neuf, France; Roland Châtelain, Frenkendorf; Petr Kvita, Reinach, both of Switzerland

[73] Assignee: Ciba-Geigy Corporation, Ardsley, N.Y.

[21] Appl. No.: 181,848

[22] Filed: Apr. 15, 1988

[30] Foreign Application Priority Data

Apr. 16, 1987 [CH] Switzerland .......................... 1507/87
Dec. 7, 1987 [CH] Switzerland .......................... 4759/87

[51] Int. Cl.$^4$ ...................... C09B 67/54; D06L 31/12
[52] U.S. Cl. ............................................ 8/527; 8/436; 8/524; 8/919
[58] Field of Search .................................. 8/527, 524

[56] References Cited

U.S. PATENT DOCUMENTS 4,689,048  8/1987  Fortsch et al. ........................ 8/524
4,690,765  9/1987  Linder et al. ...................... 210/654

FOREIGN PATENT DOCUMENTS 184993  6/1986  European Pat. Off. .
2168368  6/1986  United Kingdom .

OTHER PUBLICATIONS

W. Klein et al., 1982, Chem. Eng., 369–372, Oct. 1982.

Primary Examiner—A. Lionel Clingman
Attorney, Agent, or Firm—Edward McC. Roberts

[57] ABSTRACT

Concentrated aqueous dye formulations of water-soluble organic dyes are prepared by desalination and concentration of corresponding crude dye solutions by means of membrane separation processes. The effectiveness of the membrane separation process on the one hand and the stability of the dye formulations on the other hand is improved if dye solutions are subjected to cross-flow microfiltration before and/or after the membrane separation process and insoluble constituents are thus removed.

17 Claims, No Drawings

PROCESS FOR THE PREPARATION OF CONCENTRATED AQUEOUS DYE FORMULATIONS OF WATER-SOLUBLE ORGANIC DYES BY MEMBRANE SEPARATION AND WITH CROSS-FLOW MICRO-FILTRATION TO REMOVE SUSPENDED OR COLLOIDAL SOLIDS

The present invention relates to a process for the preparation of dye formulations of water-soluble organic dyes, the formulations prepared by the process and their use for dyeing and printing natural or synthetic fibre material.

At the end of synthesis, water-soluble organic dyes are obtained, for example, in the form of dilute aqueous solutions or as concentrated suspensions from which the dye is as a rule precipitated out by addition of salt and is then pressed off in filter presses.

Dye suspensions or dye solutions can be prepared for further processing from the resulting press-cakes by addition of water.

The necessary processing measures with the aim of preparing dye formulations which are ready for sale concern, for example, the removal of by-products and salts and the concentration of the crude dye solutions or suspensions.

A high salt content and organic by-products in particular have an adverse effect on the storage life of liquid dye formulations, in that they cause precipitations. The organic by-products, which usually also have an intrinsic colour, can additionally lead to an undersirable shift in the shade.

The use of membrane-associated filtration techniques for the preparation of formulations of water-soluble organic dyes is already known from U.S. Pat. No. 4,689,048. The process described therein starts from aqueous suspensions of the crude dye, which are substantially freed from water-soluble by-products with the aid of a first membrane separation process and in which the salt content is reduced to about half; a second membrane separation process then follows.

In this first membrane separation process, the soluble by-products and some of the salts thus permeate through the membrane, whilst the dye and water-insoluble constituents are retained.

In the second membrane separation process, the dye suspension—optionally after dilution with water—is then desalinated and concentrated and is finally converted into a liquid or solid dye formulation which is ready for sale.

The object of the present invention is now to provide processes for working up, and for converting into dye formulations ready for sale, crude dye solutions which contain relatively large amounts of by-products which are insoluble in water or sparingly soluble in water in suspended or partly also in colloidal form. According to the invention, this is achieved by using crude dye solutions—and not suspensions—and subjecting these to cross-flow microfiltration before, after or optionally before and after a membrane separation process, in order to remove the insoluble to sparingly soluble by-products mentioned. This avoids, for example, on the one hand possible membrane blockages and thus gives such high flow rates (shorter treatment times) in the (subsequent) membrane separation processes, and on the other hand also gives dye formulations which are free from troublesome insoluble constituents and have an outstanding stability.

In the cross-flow microfiltration, the solution to be filtered (feed solution) is continuously passed tangentially over the surface of the membrane in the same way as with ultra- or hyperfiltration (reverse osmosis). The solution is kept continuously in motion, and with high turbulence the formation of filtration-inhibiting deposits (secondary membrane) and blockages of the membrane pores can thus largely be avoided. The particles which have penetrated into the pore system of the membrane can be removed again by backwashing the membrane in the opposite direction to the direction of filtration.

The present invention thus relates to a process for the preparation of concentrated aqueous dye formulations of water-soluble organic dyes by desalination and concentration of corresponding crude dye solutions by means of a membrane separation process, which comprises subjecting the dye solutions to cross-flow microfiltration (called microfiltration below) before and/or after the membrane separation process for the purpose of removing insoluble constituents and converting them into a liquid or solid commercial form.

Although the microfiltration is also a membrane-associated process step, it is to be regarded as an independent process step in the present invention and does not fall under the definition of the other "membrane separation processes".

The invention also relates to the liquid or solid dye formulations prepared according to the invention and their use for dyeing and printing natural or synthetic fibre materials.

Examples of possible water-soluble organic dyes are acid (Colour Index (C.I.) acid and direct dyes) and basic (C.I. basic dyes) dyes, such as metal complex, chroming, developing and mordant dyes, and in particular reactive dyes. These are, in particular, the following metal-free or metal-containing and metallizable dyes containing sulfonic acid or carboxylic acid groups: mono-, dis- and polyazo dyes, pyrazolone, thioxanthone, oxazine, stilbene and formazan dyes, anthraquinone, nitro, methine, triphenylmethane, xanthone, naphthazarine, styryl, azastyryl, naphthoperinone, quinophthalone and phthalocyanine dyes, and, preferably, those dyes which have at least one fibre-reactive radical in the dye molecule.

The water-soluble anionic dyes primarily processed according to the present process to dye formulations are, in particular, the alkali metal salts or ammonium salts of the so-called acid wool dyes, of reactive dyes or of direct cotton dyes of the azo, anthraquinone and phthalocyanine series. Possible azo dyes are, for example, metal-containing or metal-free mono- and disazo dyes and formazan dyes which contain one or more sulfonic acid groups. Anthraquinone dyes which may be mentioned are, in particular, 1-amino-4-arylamino-anthraquinone-2-sulfonic acids, and phthalocyanine dyes which may be mentioned are, in particular, sulfated copper phthalocyanines or phthalocyanine arylamides.

Possible water-soluble metal complex dyes are metal complex dyes containing sulfonic acid or carboxylic acid groups, for example 1:1 or 1:2 metal complexes of azo or azomethine dyes or metallized phthalocyanines, in particular copper phthalocyanines and nickel phthalocyanines. The 1:1 and 1:2 metal complexes are preferably 1:1 nickel complexes, 1:1 cobalt complexes, 1:1 copper complexes, 1:1 chromium complexes, 1:1 iron complexes or symmetric or asymmetric 1:2 cobalt complexes, 1:2 iron complexes or 1:2 chromium complexes of, in particular, o-carboxy-o'-hydroxy-, o-hydroxy-o'-amino- or o,o'-di-hydroxyazo dyes of the benzene-azobenzene, naphthalene-azo-naphthalene, benzene-azo-naphthalene, benzene-azo-pyrazolone, benzene-azo-pyridone or benzene-azo-acetoacetamide type, it being possible for these groupings to be unsubstituted or also substituted. Possible substituents are, for example: unsubstituted or substituted sulfonic acid amides or sulfones, halogen or nitro.

The copper phthalocyanines and nickel phthalocyanines are derived from the customary mixtures of various degrees of sulfonation and preferably contain 2 to 3 or even 4 sulfated sulfonic acid $\beta$- or $\gamma$-hydroxy-alkylamide groups, and in addition can also contain individual halogens and individual sulfonic acid amide groups, it being possible for these sulfonic acid amide groups to be unsubstituted or substituted on the nitrogen, for example by lower alkyl, such as methyl, ethyl; propyl or butyl, or lower hydroxyalkyl groups, such as 2-hydroxyethyl, 2-hydroxypropyl or 3-hydroxypropyl.

In the present process, the azo dyes containing sulfonic acid groups are advantageously used in the form of their metal salts, for example the potassium or in particular sodium salts.

The reactive dyes contain as suitable fibre-reactive groups, for example, heterocyclic groups or an acyl group of a carboxylic acid, these groups having at least one halogen atom detachable under dyeing conditions. They are, for example, the following groups: s-triazinyl radicals which carry one or two halogen atoms, such as chlorine, fluorine or bromine atoms, on the triazine ring, pyrimidyl radicals which carry one to three halogen atoms, such as chlorine and/or fluorine atoms, or one or two arylsulfonyl or alkanesulfonyl groups on the pyrimidine ring, dichloroquinoxylinyl or 2-chlorobenzothiazolyl groups or the acyl radicals of halogen-containing aliphatic carboxylic acids or unsaturated carboxylic acids, such as chloroacetyl radical or the acyl radical of acrylic acid, or the radicals of $\beta$-bromopropionic acid and $\alpha,\beta$-dibromopropionic acid.

Examples of fibre-reactive groups of the vinylsulfone series are, in addition to the vinylsulfonyl group itself, aliphatic sulfone groups which contain a group which can be eliminated under alkaline conditions, such as a halogen atom or an ester radical of an acid, in the $\beta$-position relative to the sulfone group, such as, for example, the $\beta$-chloroethylsulfonyl, $\beta$-acetoxyethylsulfonyl, $\beta$-(3-sulfobenzoyloxy)-ethylsulfonyl, $\beta$-sulfatoethylsulfonyl, $\beta$-thiosulfatoethylsulfonyl, $\beta$-phosphatoethylsulfonyl, $\beta$-sulfatoethylsulfonylmethylamino, vinylsulfonylmethylamino, 4-vinylsulfonylbutyryl, 4-chloroethylsulfonylbutyryl, vinylsulfonylethoxyethylamino or the 4-$\beta$-sulfatoethylsulfonylanilino group.

Further possible fibre-reactive groups are moreover, for example: halogenocyclobutane and mono- or bis-($\gamma$-halogeno-$\beta$-hydroxypropyl)-amino groups, $\beta$-halogenoethylsulfamide radicals, $\beta$-halogenoethoxy groups, $\beta$-halogenoethylmercapto groups, $\gamma$-halogeno-$\beta$-hydroxy-propylsulfamide radicals or 2,3-epoxypropyl groups.

The reactive radicals can contain one of the fibre-reactive groups mentioned or even several of these groups, for example three or four. The fibre-reactive groups can be identical to or different from one another.

The water-soluble basic dyes are the customary salts and metal halide, for example zinc chloride, double salts of the known cationic dyes, in particular the methine and azamethine dyes, which contain, for example, an indolinium, pyrazolium, imidazolium, triazolium, tetrazolium, oxadiazolium, thiodiazolium, oxazolium, thiazolium, pyridinium, pyrimidinium or pyrazinium ring.

The heterocyclic rings mentioned can be unsubstituted or substituted and/or non-fused or fused with aromatic rings. Cationic dyes of the diphenylmethane, triphenylmethane, oxazine, thiazine and 1,2-pyran series are furthermore possible, as are, finally, also colour salts of the arylazo and anthraquinone series.

Optionally, the dyes can also be present in mixtures with one another or optionally with dyes of another type.

The term water-soluble organic dyes in the present case is also understood as meaning water-soluble fluorescent brighteners, and in particular especially stilbene brighteners, especially those of the bistriazinylaminostilbene-disulfonic acid, bis-styrylbiphenyl and -benzene and bistriazolyl-stilbene-disulfonic acid types. The brighteners containing sulfo groups are preferably present here in the form of their metal salts such as are obtained during synthesis, for example the lithium, potassium, magnesium or in particular sodium salts, and the ammonium, amine or alkanolamine salts.

The stilbene brighteners containing sulfo groups which are preferably processed with the aid of the process according to the invention to solid or liquid commercial forms are those of the following formula:

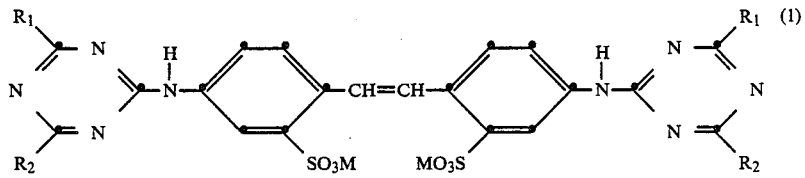

in which M is hydrogen or an alkali metal, alkaline earth metal, ammonium or amine salt cation and R$_1$ and R$_2$ independently of one another are —NH$_2$, —NHCH$_3$, —NHC$_2$H$_5$, —N(CH$_3$)$_2$, —N(C$_2$H$_5$)$_2$, —NHCH$_2$CH$_2$OH, —NHCH$_2$CH$_2$CH$_2$OH, —N(CH$_2$CH$_2$OH)$_2$, —N(CH$_2$CH$_2$CH$_2$OH)$_2$, —N(CH$_3$)(CH$_2$CH$_2$OH), —NHCH$_2$CH$_2$OCH$_2$CH$_2$OH, —NHCH$_2$CH$_2$CH$_2$SO$_3$M, —OH, —OCH$_3$, —OCH(CH$_3$)$_2$, —OCH$_2$CH$_2$OCH$_3$,

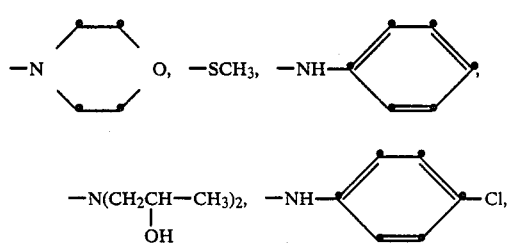

-continued

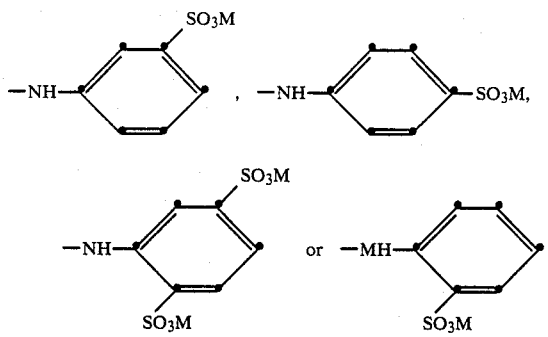

in which M is hydrogen or an alkali metal, alkaline earth metal, ammonium or amine salt cation; or of the formula

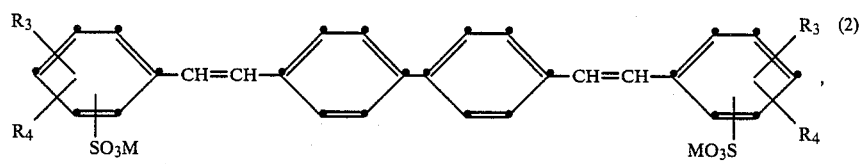

in which $R_3$ is hydrogen, alkyl with 1 to 4 carbon atoms, alkoxy with 1 to 4 carbon atoms, halogen or $SO_3M$, $R_4$ is hydrogen or alkyl with 1 to 4 carbon atoms and M is hydrogen or an alkali metal, alkaline earth metal, ammonium or amine salt cation; and furthermore of the formula in which M is hydrogen or an alkali metal, alkaline earth metal, ammonium or amine salt cation and $R_5$ and $R_6$ independently of one another are hydrogen, $—CH_3$, or $R_5$ and $R_6$ together make up a benzene ring.

These dyes and fluorescent brighteners are prepared by known continuous or discontinuous processes and at the end of the synthesis, depending on the process procedure and solubility properties, are obtained in the form of a synthesis solution or synthesis suspension.

Only dye solutions are used for the process according to the invention. If dye suspensions are present at the end of the synthesis, these must be diluted accordingly.

Suitable membrane separation processes for the process according to the invention are, for example
  dialysis over a concentration gradient on ion-selective membranes, or
  electrodialysis by applying an electrical voltage and using ion exchanger membranes as diaphragms, and in particular
  ultrafiltration and
  reverse osmosis.

Ultrafiltration and reverse osmosis are as a rule carried out with fine-pored membranes with pore diameters of about 0.1 to 1,000 nm. The pore diameters for reverse osmosis (hyperfiltration) membranes are in the lower part of this range, that is to say essentially in the range from 0.1 to 50 nm, preferably in the range from 0.1 to 10 nm.

The ultrafiltration can be carried out either under pressure or by applying a vacuum. It is furthermore possible to apply pressure on the dye solution side and at the same time a vacuum on the permeate side. The process is generally carried out under a pressure of 0.5 to 10 bar or a vacuum of 200 to 10 mbar. The ultrafiltration is advantageously be carried out by applying a vacuum, since a reduced pressure counteracts blocking of the membrane on the permeate side and significantly increases the membrane flux.

The hyperfiltration is a molecular separation method which is carried out using semipermeable membranes with a cut-off level in the molecular weight range from, for example, 300 to 1,000, preferably 400 to 800. Such membranes allow through water and dissolved substances, which are below the separation limit because of their molecular weight, under a low to moderate pressure. Pressures of 10 to 100 bar, and preferably 10 to 40 bar are generally used.

The membranes preferably used in the process according to the invention because of their good separation properties consist of polymeric, organic materials, which may be chemically modified, for example on their surfaces, optionally by acid or basic groups, for example sulfonated.

The polymeric membrane materials are preferably naturally occurring, semi-synthetic or synthetic materials which contain reactive groups, for example hydroxyl, amino and/or amidoxime groups. Such materials—if they are to be chemically modified—can be reacted with suitable compounds which contain on the one hand acid or basic groups and on the other hand at least one grouping which can react to form a chemical (covalent) bond.

The acid groups are in particular carboxyl and sulfone groups, and the basic groups are primary, secondary or tertiary amino groups, and furthermore phosphonium or sulfonium groups.

The following polymers, for example, can be used to prepare membranes:

cellulose acetates, for example those with a low acetyl group content, but also cellulose with a higher acyl content, for example so-called two and a half acetate, or polyvinyl alcohols, polyacrylonitrile and copolymers of acrylonitrile and other ethylenically unsaturated monomers, polysulfones, polystyrenes, polyamides or polyimides.

Appropriate mixtures of these polymers are also suitable.

Those polymers which have been chemically modified as described, before or after or in combination partly before and partly after the membrane formation, are preferably used.

Possible reactive compounds which contain an acid or basic group are colourless and coloured compounds, in particular acid reactive dyes, which can belong to various classes, such as anthraquinone, azo and formazan dyes. Optionally, they can also be in the form of metal complexes.

Semipermeable membranes with pore diameters of 0.1 to 50 nm and a cutoff level in the molecular weight range from 300 to 1,000, preferably from 400 to 800, are particularly suitable. These are essentially customary anionically modified cellulose acetate, polyacrylonitrile, polystyrene, polyvinyl alcohol and, in particular, polysulfone membranes (U.S. Pat. No. 4,247,401, U.S. Pat. No. 4,604,204, U.S. Pat. No. 4,584,103, U.S. Pat. No. 4,477,634, U.S. Pat. No. 4,690,765, U.S. Pat. No. 4,690,766, EP-A-47,953 and EP-A-82,355).

Microporous membranes with pore diameters of 0.05, in particular 0.1 to 40 $\mu$m, preferably from 0.2 to 10 $\mu$m, are customarily used for the microfiltration which is inserted according to the invention before and/or after the membrane separation process and serves to remove undissolved (suspended or colloidal) components from the dye solutions.

The microfiltration can be carried out under an operating pressure of 0.5 to 10 bar, preferably 0.5 to 5 bar.

The particles of solid which may be deposited on the membrane during the microfiltration can be rinsed off from the membrane surface by a backwashing operation. For this, a higher pressure than on the retained material side is applied for a short time to the filtrate side of the membrane. The filtrate can thus flow through the pores and rinse the retained material side free from deposits.

Possible membranes for the microfiltration are either those of organic or those of inorganic material.

Examples of organic membrane materials are organic polymers, in particular polyethylenes, polypropylenes, polytetrafluoroethylenes, cellulose acetates, polyacrylonitriles, polyvinyl alcohols, polystyrenes, polysulfones, polyimides or polyamides, which may be modified chemically or physically.

Examples of inorganic membranes are those of porous metal or metal alloys (so-called sintered metal membranes, for example of porous steel) or those of porous carbon, the surface of which can be coated, for example, with a thin layer of zirconium oxide, silicon oxide or aluminium oxide, or of porous glass or ceramic, it being possible for the ceramic membranes to be coated, for example, with aluminium oxide; and furthermore also aluminium oxide membranes, optionally coated with zirconium oxide. Organic and inorganic membranes are advantageously used in tubular form, the tubes being combined in a tubular membrane module. The following membranes, for example, are preferably used (the figures in brackets (molecular weights) indicate the cut-off level): polyacrylonitrile membrane ($\sim$100,000), cellulose acetate membrane ($\sim$5,000 or $\sim$20,000), polysulfone membrane ($\sim$10,000) and carbon membrane coated with zirconium oxide ($\sim$20,000, $\sim$40,000 or $\sim$50,000).

The membranes can of course not only be in the form of tubes, but can also be in the form of sheets, flexible tubes or hollow fibres.

The dye solutions used according to the invention as a rule have a dye content of 5 to 20% by weight and a salt content (inorganic salts) of 1 to 20% by weight, in particular 1 to 10% by weight. The pH is as a rule in the range from 3 to 10, preferably 3 to 9. Insoluble constituents are removed by microfiltration and the concentration and desalination is carried out until a dye content of 10 to 50% by weight is reached. The salt content thereby drops to below 5% by weight, for example 0.05 to 5% by weight, and preferably below 1% by weight, for example 0.05 to 1% by weight.

The dye solutions used according to the invention can have temperatures in the range from 10° to 80° C., preferably 20° to 60° C.

The concentrated dye formulations thus obtained, which are distinguished by their high concentration of dye, their homogeneity and their good stability (for several months) in a wide temperature range (0° C. to 50° C.), can then be converted into liquid or solid commercial forms.

To prepare the concentrated dye or brightener formulations according to the invention, it is advantageous to use dye or brightener salts with a good water-solubility, since only in this way can the water content in the products be kept as low as possible. In addition, however, a high water-solubility of the dye or brightener is also advantageous for the preparation of solid products, since this allows gentle and energy-saving drying because highly concentrated starting solutions can be used.

In its preferred embodiment, the process according to the invention comprises three membrane-associated separation operations and is divided into the following individual steps:

Cross-flow microfiltration of the aqueous solution of the crude dye to remove undissolved constituents.

Ultrafiltration/hyperfiltration of the dye solution, during which the solution is desalinated to values below 1% by weight and the dye concentration is increased to 15 to 45% by weight.

Cross-flow microfiltration of the concentrated dye solution to remove insoluble constituents.

Subsequent preparation of the liquid or solid dye formulation ready for commercial use.

The resulting dye solutions can be passed to the membrane separation process according to the invention directly after synthesis of the dye or independently of this.

To prepare a liquid form ready for commercial use, the concentrated aqueous dye formulation has only to be brought to a given end dye content by dilution and/or with the aid of extenders, optionally after addition of the components customary for liquid formulations, such as solubilizing agents, foam-suppressing agents, antifreeze agents, humectants, surfactants, buffer substances and/or antimicrobic agents, and adjustment of the pH. However, the dye formulation can also be converted into a solid dye product by removal of water, optionally after addition of additives, such as binders, dust removal agents, wetting agents, buffer substances, such as alkali metal polyphosphates, disodium hydrogen phosphate, citric acid and/or ethylenediaminetetraacetic acid, and/or extenders. Thanks to the increased dye concentration, less energy is needed for drying. The customary drying processes, in particular spray-drying, are used.

The pH of the liquid formulation of the reactive dyes which is ready for commercial use is as a rule adjusted by addition of buffer substances. The pH varies in the stated limits of from 3 to 9 according to the reactive groupings present in the dyes, the following approximate ranges applying to the individual groups of dyes (only the reactive groupings are given): chloro- or fluorotriazinyl (monoreactive)—pH of 7.0 to 8.5, preferably 8.0; fluorotriazinyl and vinylsulfonyl (or precursors, such as sulfato- or halogenoethylsulfonyl) (bireactive) —pH of 6.5 to 8.5, preferably 7.0; chlorotriazinyl and vinylsulfonyl (or precursors, such as sulfato- or halogenoethylsulfonyl)—pH of 5.0 to 6.5, preferably 6.0; vinylsulfonyl (or precursors, such as sulfato-or halogenoethylsulfonyl) (mono-, bi- or polyreactive)—pH of 2.5 to 5.5, preferably 3.5 to 4.5 and in particular 4.5.

The auxiliaries or additives mentioned can of course not only be added to the dye solution before its final formulation as the commercial form but can already be introduced into the solution of the crude dye before or during the process according to the invention, and are thus at least in part already present in the dye solution from which the final dye formulation ready for commercial use is prepared (for example solubilizers, solvents, surfactants and the like). Addition during the process is of course only appropriate if the auxiliary or auxiliaries or additive(s) are not removed completely from the solution again by one of the membrane separation processes.

The dye formulations (in their commercial form) are used for the preparation of dyebaths, padding liquors or printing pastes which are suitable, depending on the dye, for dyeing and printing natural and also synthetic fibre materials, for example textile fibre materials of cotton, wool, silk, polyacrylonitrile or polyamide, or those materials of fibre blends, for example of wool/polyamide, and furthermore paper or leather; the brightener formulations are used, for example, for fluorescent brightening of textile materials, leather or paper.

The following examples serve to illustrate the invention; parts are parts by weight and percentages are percentages by weight, unless indicated otherwise. The membrane flux is stated in litres of permeate per m² of membrane area and day ($l/m^2 \times d$).

EXAMPLE 1

30 kg of a crude dye solution of the dye of the formula

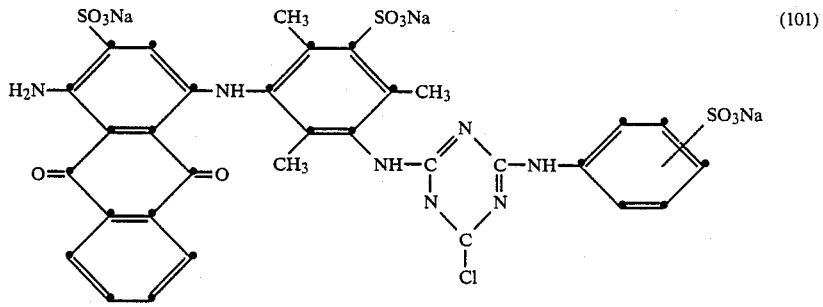

(101)

with a dry substance content of 10% by weight, of which 1.5% by weight is salt, and a content of insoluble solids of about 0.2% by weight are subjected to microfiltration (cross-flow microfiltration) over membrane modules fitted with tubular polypropylene membranes. The length of the membranes is 0.5 m and the internal diameter is about 5.5 mm. The microfiltration is carried out at 40° C. (solution temperature); it is circulated, the entry pressure is 2 bar, the discharge pressure is 1.6 bar, the total membrane area is 0.05 m² and the retained material volume flow is approximately 2 m³/hour.

The microfiltration is ended after four hours. About 25 kg of a dye solution which is free from undissolved constituents (solids) is obtained.

This dye solution is desalinated and concentrated by a reverse osmosis process. The reverse osmosis is carried out in two stages at a pH of the solution of 6.5 to 7.5, at 20° C. under a pressure of 25 bar. A polysulfone membrane (prepared in accordance with Example 1 of U.S. Pat. No. 4,690,765), the separation (exclusion) limit (cut-off level) of which is about 500 is used. The reverse osmosis unit used has a total membrane area of 0.81 m²:

Desalination (stage 1)

After addition of 30 l of water and subsequent removal of 35 l of permeate (average flow about 20 l/hour), a dye solution with an inert salt content of 0.5% by weight is obtained.

Concentration (stage 2)

After the desalination, a further 17 l of permeate (average flow about 10 l/hour) are removed. 8 kg of a concentrated dye solution with a dry substance content of 30% by weight, the sodium chloride content of which is less than 0.1%, are obtained.

A 35% (per cent by volume) higher permeate flux output in comparison with dye solutions which have not been subjected to clarification by filtration (cross-flow microfiltration) could be achieved during the concentration.

Storage-stable aqueous dye formulations which can be put to use directly in dyeing (preparation of, for example, dye liquors) can be prepared from the dye solution obtained after the concentration step by addition of customary auxiliaries, for example buffer substances, solubilizing agents, biocides, foam suppressants and the like. The pH of these dye formulations is in the range from about 6.5 to 8.5. They are stable in the temperature range from −10° to 40° C. for at least 9 months.
Storage-stable, concentrated dye formulations can be prepared in an analogous manner from the crude dye solutions of the monoreactive dyes of the following formulae:
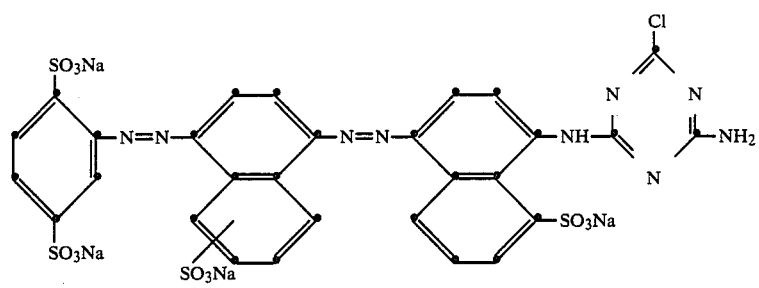
(102)
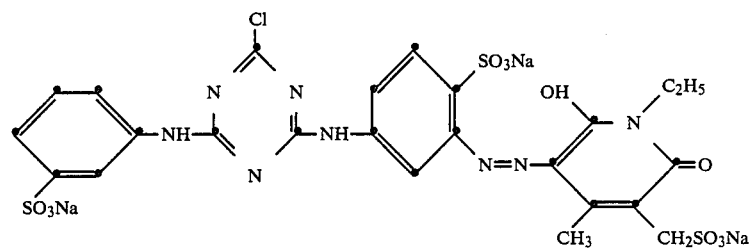
(103)
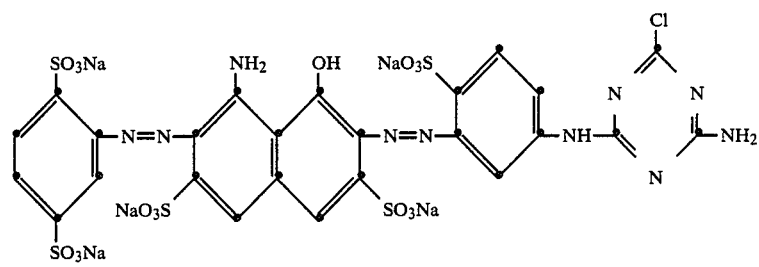
(104)
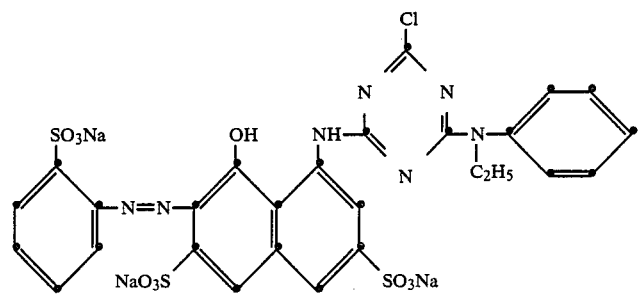
(105)
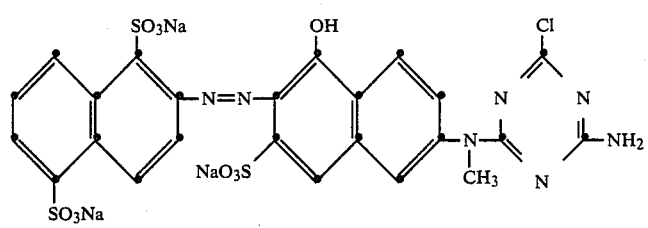
(106)
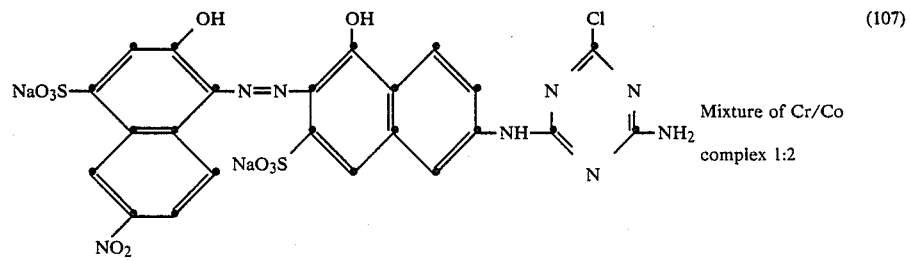
(107)
Mixture of Cr/Co complex 1:2

-continued

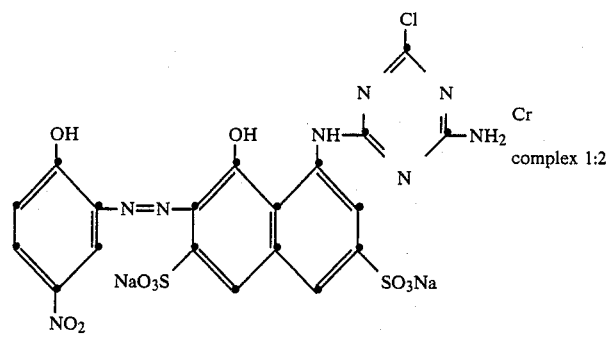
(108)

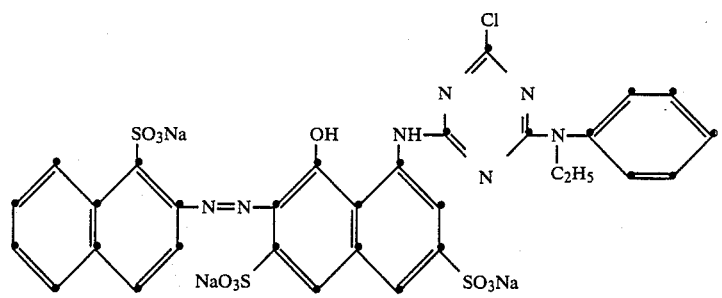
(109)

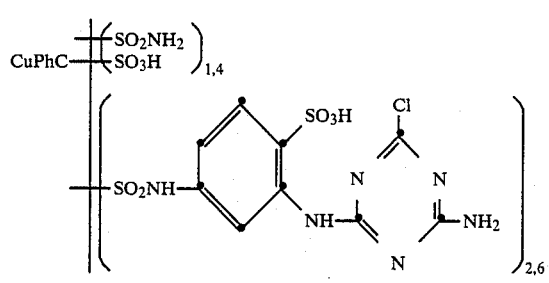
(110)

(CuPhC = copper phthalocyanine radical).

EXAMPLE 2

8.6 l of a 25% by weight aqueous solution of the dye of the formula

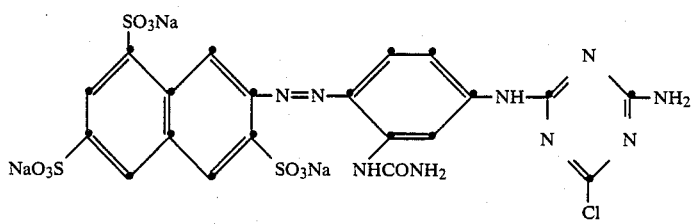
(111)

with a solids content of about 0.2% are subjected to microfiltration over a membrane module fitted with tubular polypropylene membranes. The dye solution is obtained as described in Example 1 by desalination and concentration of a corresponding crude dye solution by a reverse osmosis process. The internal diameter of the membrane tubes for the microfiltration (cross-flow microfiltration) is about 5.5 mm, the length is 0.5 m and the total membrane surface is about 0.05 m².

The dye solution is subjected to microfiltration until it is free from solids (1 hour). For this, it is circulated, the temperature of the solution is 45° C., the entry pressure is 2.5 bar and the discharge pressure is 1.4 bar.

8.4 l of concentrated stable dye solution which is free from solids are obtained. As described in Example 1, storage-stable dye formulations for commercial use can be prepared therefrom by addition of customary auxiliaries.

EXAMPLE 3

1 kg of press-cake of the dyestuff of the formula

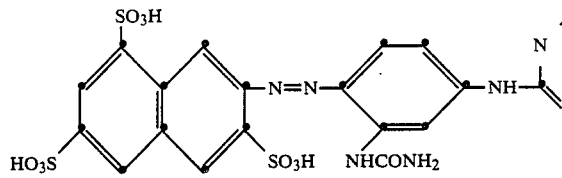 

(112)

is dissolved in 4.5 l of deionized water. A cloudy dye solution is obtained and is subjected to microfiltration at an increased pressure of 0.8 bar over a membrane of porous carbon coated with zirconium oxide (cut-off level ≧ 50,000). The clear filtrate (4.0 l) is then desalinated and concentrated by a two-stage reverse osmosis process as described in Example 1. The time required for this reverse osmosis process is 40% less in comparison with carrying out this process with a dye solution which has not been subjected to microfiltration.

auxiliaries and after subsequent microfiltration. The pH of the dye formulations is as a rule in the range from 7.0 to 8.5.

Storage-stable concentrated dye formulations can also be prepared in an analogous manner from presscakes of the reactive dyes of the following formulae:

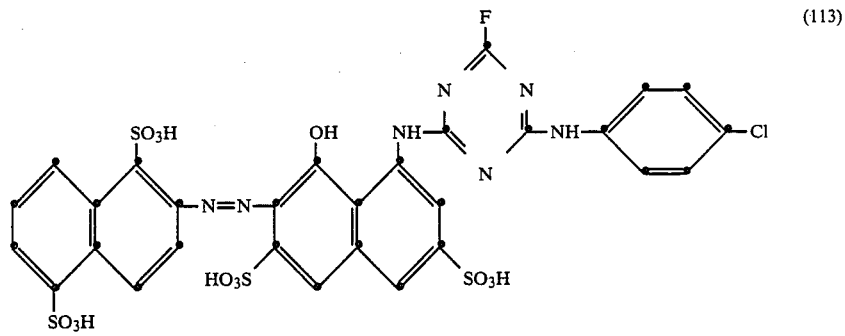

(113)

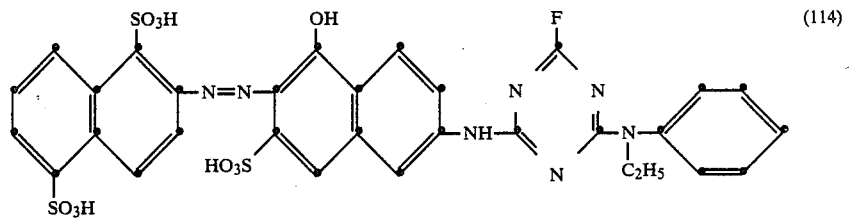

(114)

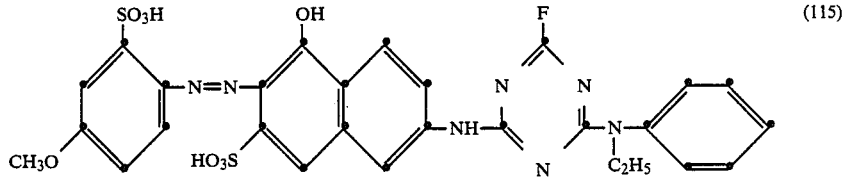

(115)

EXAMPLE 4

3 l of a cloudy aqueous solution of the dye of the formula

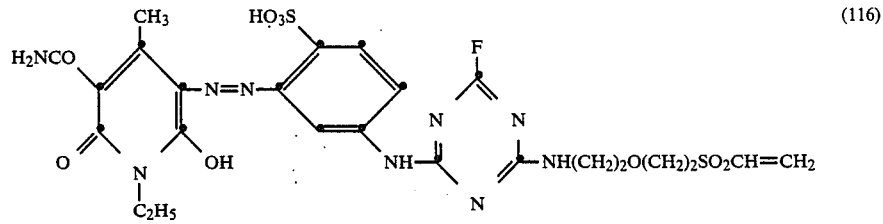

(116)

2.3 kg of a concentrated dye solution with a dry matter content of 19.6%, the sodium chloride content of which is less than 0.3%, are obtained.

Storage-stable, commercial dye formulations which are suitable for direct use can be prepared from this concentrated dye solution by addition of the customary which is obtained by the reverse osmosis process according to Example 1 and has a dry matter content of 25% by weight is subjected to microfiltration under an increased pressure of 0.8 bar over a membrane of porous carbon coated with zirconium oxide (cut-off level ≧50,000).

The duration of the microfiltration (2 hours) is shortened by more than 50% in comparison with conventional static filtration methods.

2.8 l of a clear filtrate with a dye content of 25% by weight and a salt content (sodium chloride) of about 0.1% by weight are obtained.

A concentrated storage-stable dye formulation, the pH of which is 6.5 to 8.5, is prepared from this solution by addition of sodium tripolyphosphate as a buffer in an amount of up to 2.5% by weight, based on the total dye solution.

Concentrated storage-stable dye formulations can also be prepared in an analogous manner from crude dye solutions containing dyes of the following formulae. The amount of sodium tripolyphosphate used can vary in the range from 1.8 to 3.6% by weight, based on the total formulation.

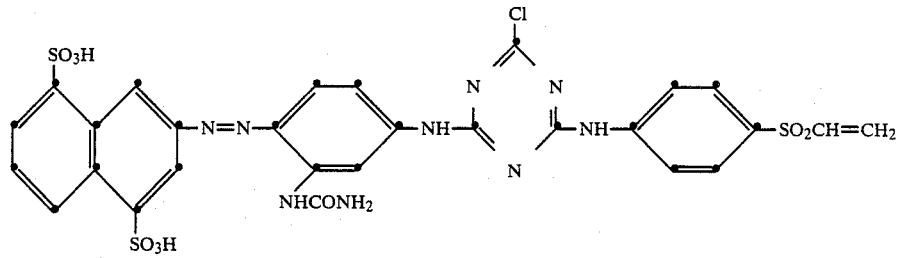
(117)

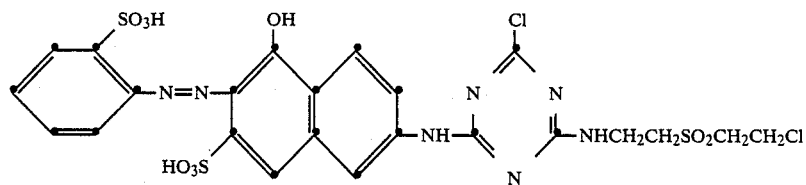
(118)

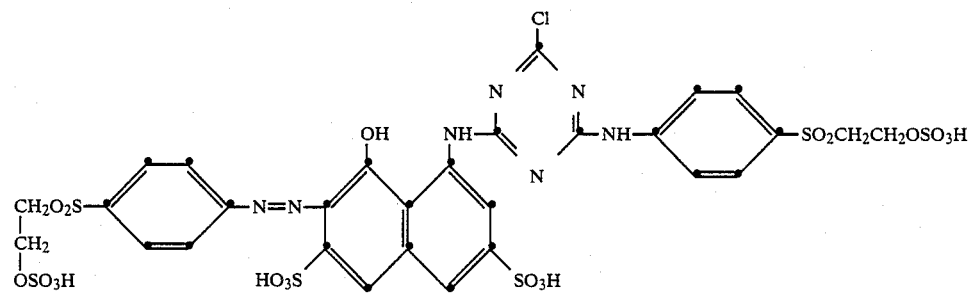
(119)

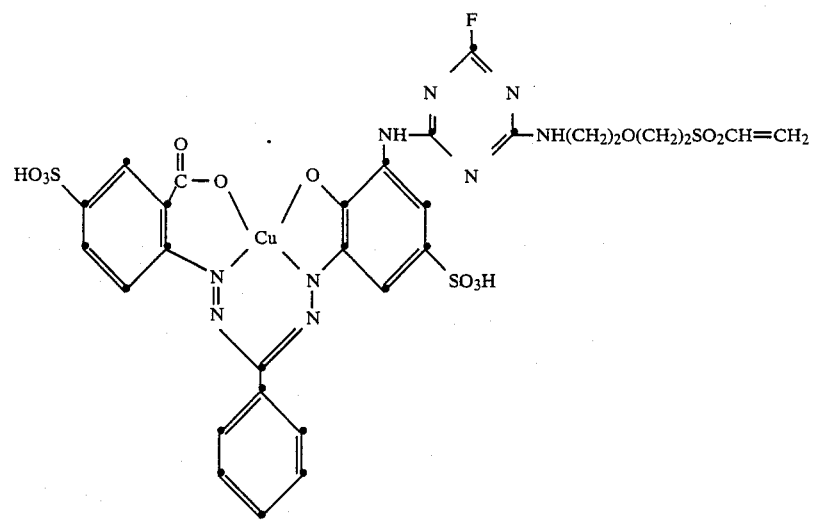
(120)

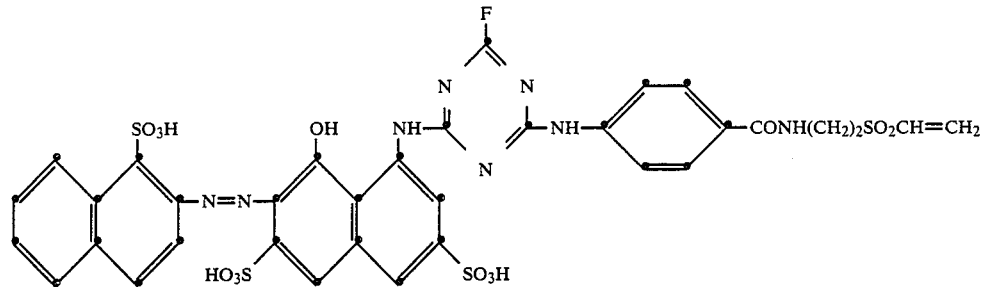
(121)

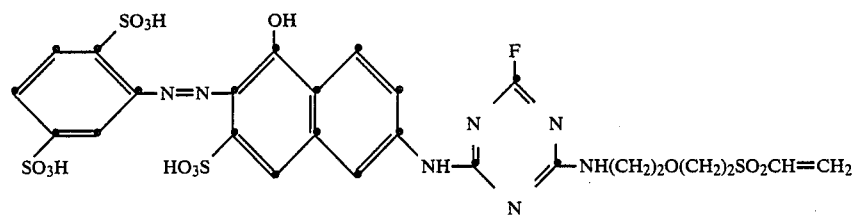
(122)

In the following formulae, X is fluorine or chlorine. Dye formulations of dyes in which X is fluorine are as a rule buffered with sodium tripolyphosphate or with a mixture of sodium tripolyphosphate and citric acid or dihydrogen phosphate and citric acid. The pH of the formulations is in the range from about 6.5 to 8.5, and is preferably about 7. If X is chlorine, the corresponding dye formulations are brought to pH values in the range from 5 to 6.5, preferably about 6. Suitable buffer substances are, for example, disodium hydrogen phosphate or citric acid. As an alternative, a suitable mixture of ethylenediaminetetraacetic acid and sodium tripolyphosphate can be used as the buffer in both cases.

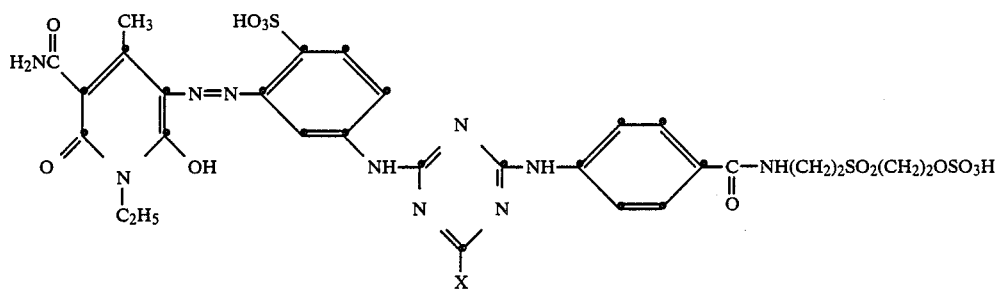
(123)

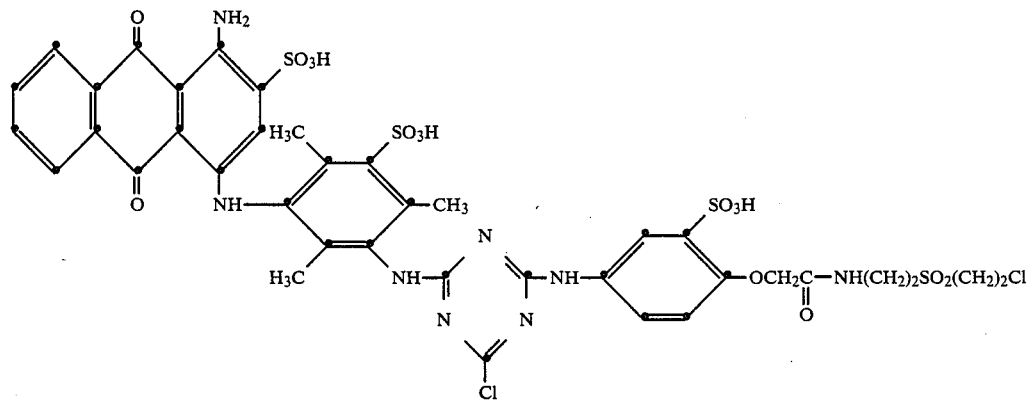
(123a)

| Example | Structure | X | X | Shade |
|---|---|---|---|---|
| (124) | Dye structure with naphthalene-SO₃H groups, azo linkage, triazine with X, and $-C(O)-NHCH_2CH_2SO_2CH_2CH_2OSO_3H$ group; contains $-NH-C(O)-NH_2$ (carbamoyl) | Cl | F | golden yellow |
| (125) | Dye structure with naphthalene-SO₃H, azo, carbamoyl $-NH-C(O)-NH_2$, triazine with X, linked to $-NH-CH_2CH_2OCH_2CH_2SO_2CH=CH_2$ | Cl | F | " |
| (126) | Dye structure with naphthalene-SO₃H, azo to phenyl bearing OCH₃ and CH₃, NH-triazine(X), phenyl-$C(O)-NHCH_2CH_2SO_2CH_2CH_2OSO_3H$ | Cl | F | " |
| (127) | Dye with naphthalene (HO₃S, SO₃H), azo, phenyl-NHCONH₂, NH-triazine(X), phenyl-$C(O)-NHCH_2CH_2SO_2CH_2CH_2OSO_3H$ | Cl | F | " |

-continued

| Example | [structure] | X | X | Shade |
|---|---|---|---|---|
| (128) | [dye structure with naphthalene-SO₃H groups, N=N, phenyl-OCH₃, NH-triazine, NH-phenyl-C(O)-NHCH₂CH₂SO₂CH₂CH₂OSO₃H] | Cl | F | golden yellow |
| (129) | [dye structure with naphthalene-SO₃H groups, N=N, phenyl with NHC(O)NH₂, NH-triazine, NH-phenyl-C(O)-NHCH₂CH₂SO₂CH₂CH₂OSO₃H] | Cl | F | " |
| (130) | [dye structure with naphthalene-SO₃H groups, N=N, phenyl-NH₂/SO₃H, NH-triazine, NH-phenyl-C(O)-NH(CH₂)₂SO₂CH=CH₂] | Cl | F | " |

-continued

| Example | | X | X | Shade |
|---|---|---|---|---|
| (131) | (structure) | Cl | F | golden yellow |
| (132) | (structure) | Cl | F | " |
| (133) | (structure) | Cl | F | " |

-continued

| Example | Structure | X | X | Shade |
|---|---|---|---|---|
| (134) | [naphthol-azo-benzenesulfonic acid / triazine / phenyl-C(O)NHCH₂CH₂SO₂CH₂CH₂OSO₃H] | Cl | F | yellowish-tinged orange |
| (135) | [naphthol-azo-benzenesulfonic acid / triazine / phenyl-C(O)NHCH₂CH₂SO₂CH=CH₂] | Cl | F | " |
| (136) | [naphthol-azo-(methoxy)benzenesulfonic acid / triazine / phenyl-C(O)NHCH₂CH₂SO₂CH₂CH₂OSO₃H] | Cl | F | orange |
| (137) | [naphthol-azo-(methyl)benzenedisulfonic acid / triazine / phenyl-C(O)NHCH₂CH₂SO₂CH=CH₂] | Cl | F | " |

-continued

| Example | Structure | X | X | Shade |
|---|---|---|---|---|
| (138) | [structure with SO₃H, OH, naphthalene-azo-naphthalene, NH-triazine(X)-NH-phenyl-C(O)NHCH₂CH₂SO₂CH₂CH₂OSO₃H] | Cl | F | orange |
| (139) | [structure with H₃C, SO₃H, OH, naphthalene-azo-naphthalene, NH-triazine(X)-NH-phenyl-C(O)NHCH₂CH₂SO₂CH₂CH₂OSO₃H] | Cl | F | reddish-tinged orange |
| (140) | [structure with HO₃S, OH, SO₃H naphthalene-azo-naphthalene, NH-triazine(X)-NH-phenyl-C(O)NHCH₂CH₂SO₂CH₂CH₂OSO₃H] | Cl | F | " |
| (141) | [structure with SO₃H, OH, HO₃S naphthalene-azo-naphthalene, NH-triazine(X)-NH-(CH₂)₂O(CH₂)₂SO₂CH=CH₂] | Cl | F | " |
| (142) | [structure with CH₃O, SO₃H, OH, HO₃S naphthalene-azo-phenyl, NH-triazine(X)-NH-phenyl-C(O)NHCH₂CH₂SO₂CH₂CH₂OSO₃H] | Cl | F | scarlet |

-continued

| Example | [structure] | X | X | Shade |
|---|---|---|---|---|
| (143) | | Cl | F | scarlet |
| (144) | | Cl | F | " |
| (145) | | Cl | F | " |
| (146) | | Cl | F | red |

-continued
| Example | | X | X | Shade |
|---|---|---|---|---|
| (147) | 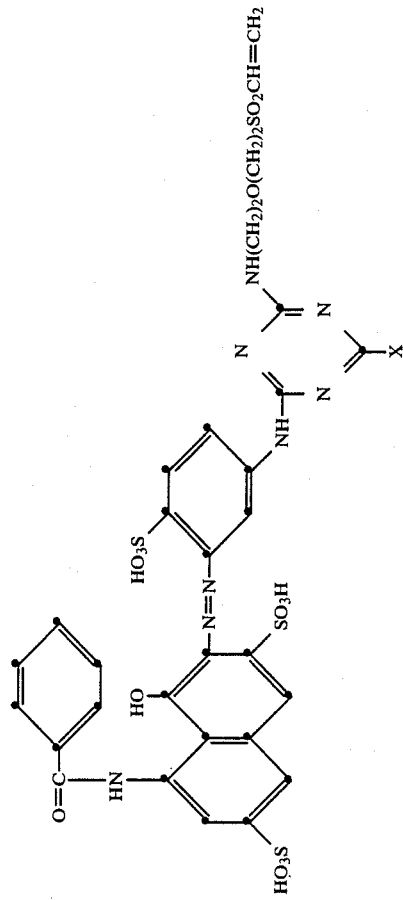 | Cl | F | red |
| (148) | 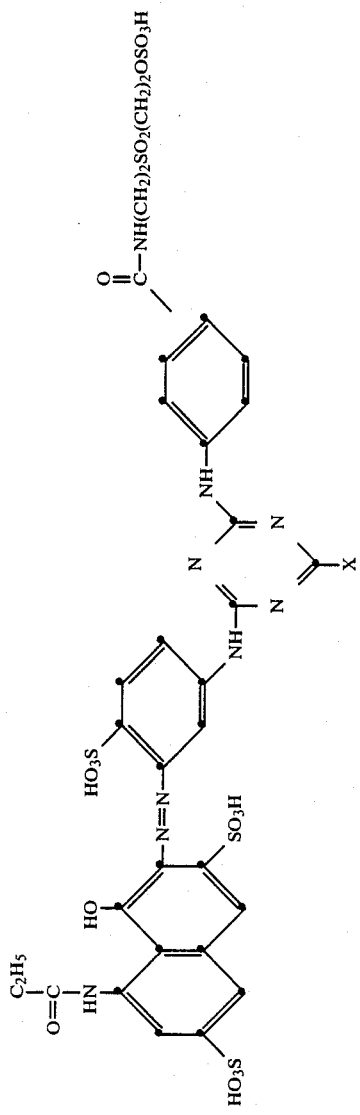 | Cl | F | scarlet |

-continued
| Example | | X | X | Shade |
|---|---|---|---|---|
| (149) | 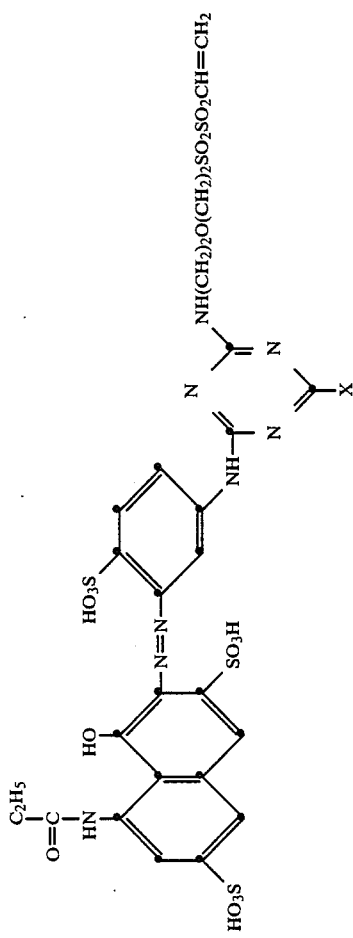 | Cl | F | " |
| (150) | 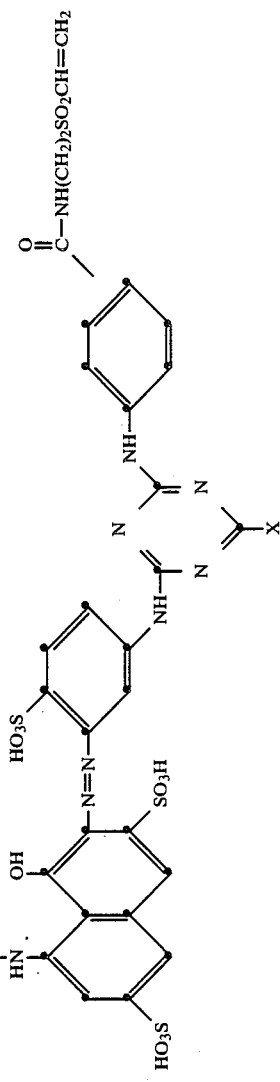 | Cl | F | scarlet |

-continued

| Example | Structure | X | X | Shade |
|---|---|---|---|---|
| (151) | [dye structure with acetylamino-naphthol-azo-phenyl-SO₃H linked to triazine with NH(CH₂)₂O(CH₂)₂SO₂CH=CH₂] | Cl | F | " |
| (152) | [bis-azo dye structure with benzoylamino-naphthol groups linked via triazine with NH(CH₂)₂SO₂(CH₂)₂OSO₃H] | Cl | F | " |

-continued
| Example | | X | X | Shade |
|---|---|---|---|---|
| (153) | 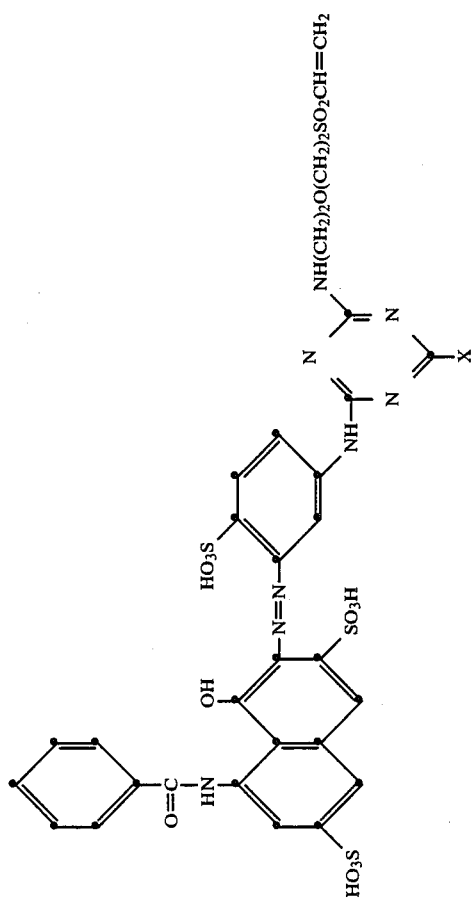 | Cl | F | red |
| (154) | 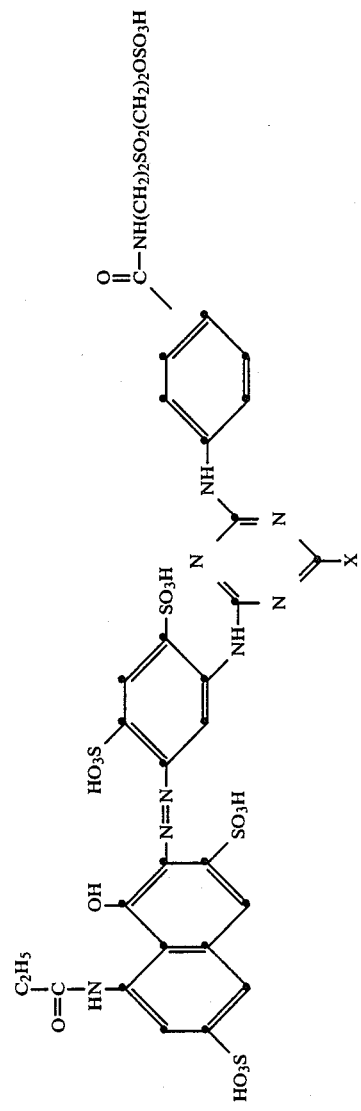 | Cl | F | scarlet |

-continued
| Example | | X | X | Shade |
|---|---|---|---|---|
| (155) | 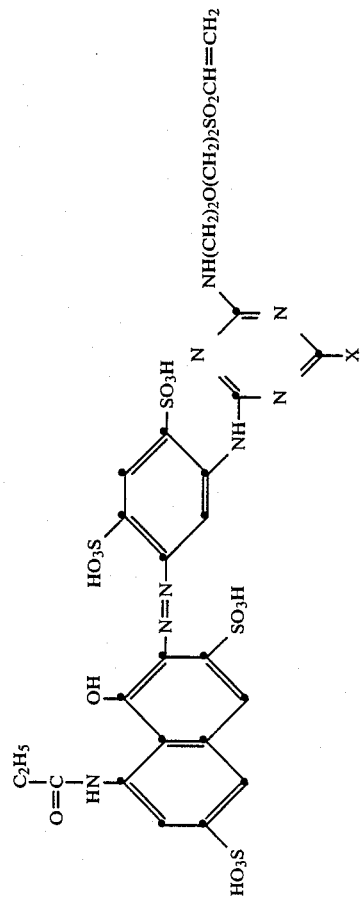 | Cl | F | " |
| (156) | 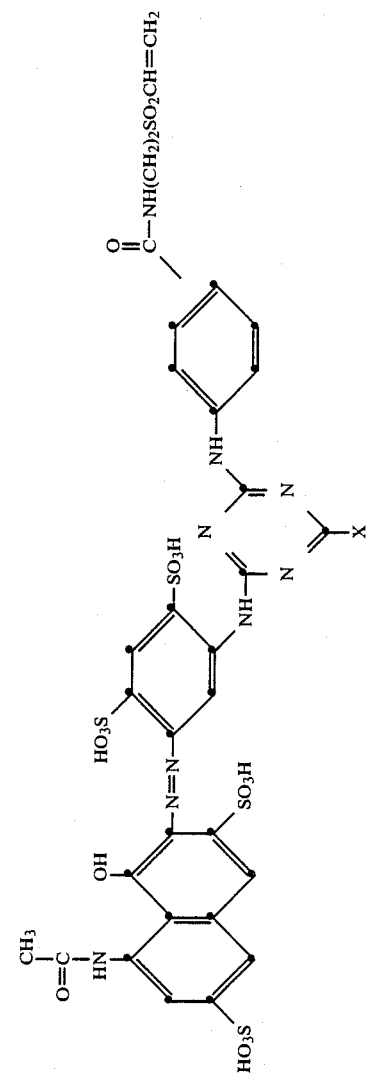 | Cl | F | scarlet |

-continued

| Example | Structure | X | X | Shade |
|---------|-----------|---|---|-------|
| (157) | | Cl | F | " |
| (158) | | Cl | F | red |
| (159) | | Cl | F | red |

-continued

| Example | (structure) | X | X | Shade |
|---------|-------------|---|---|-------|
| (160) | Naphthalene azo dye with -C(=O)-NH(CH$_2$)$_2$SO$_2$(CH$_2$)$_2$OSO$_3$H group and triazinyl substituent | Cl | F | scarlet |
| (161) | Naphthalene azo dye with -C(=O)-NHCH$_2$CH$_2$SO$_2$CH=CH$_2$ group and triazinyl substituent | Cl | F | " |
| (162) | Naphthalene azo dye with -C(=O)-NHCH$_2$CH$_2$SO$_2$CH$_2$CH$_2$OSO$_3$H group and triazinyl substituent | Cl | F | red |

-continued
| Example | Structure | X | X | Shade |
|---|---|---|---|---|
| (163) | 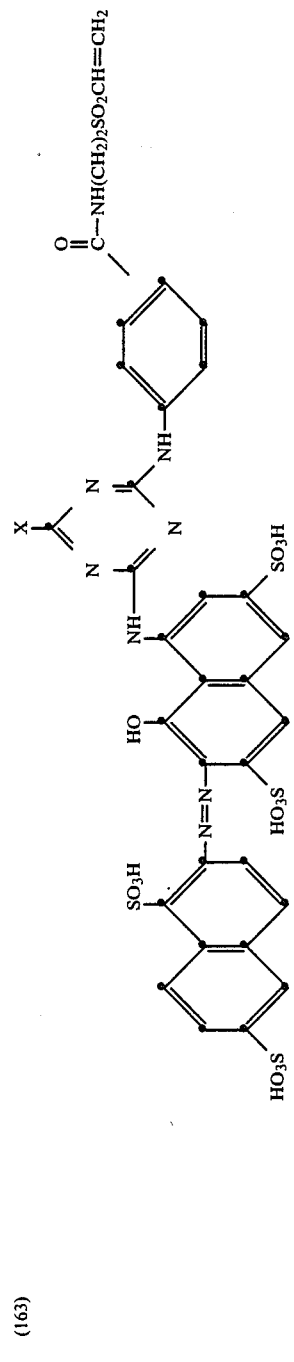 | Cl | F | " |
| (164) | 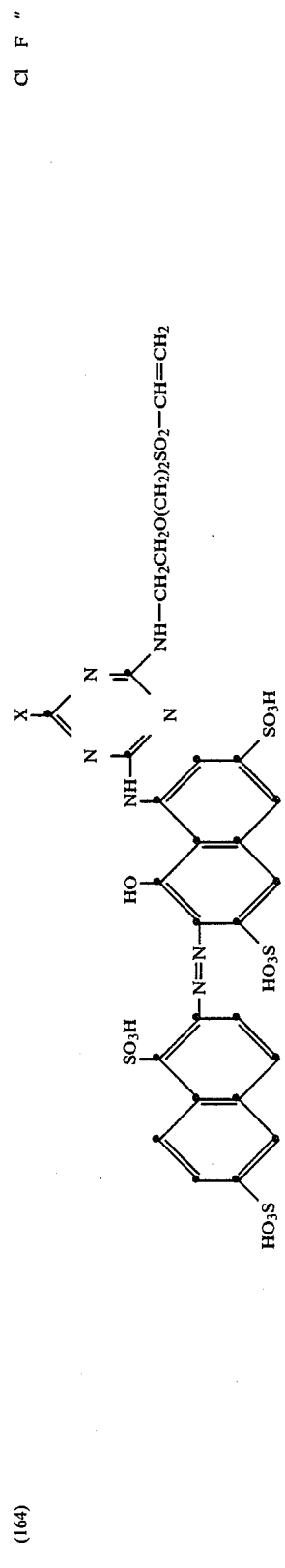 | Cl | F | " |
| (165) | 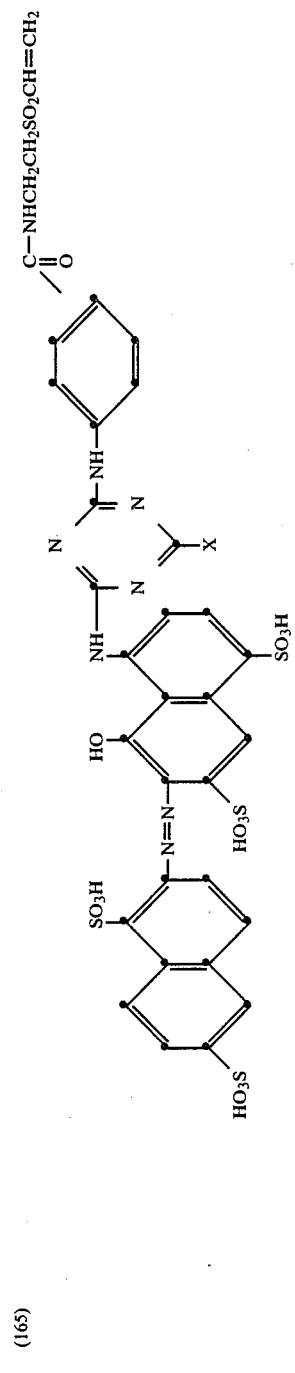 | Cl | F | red |

-continued

| Example | Structure | X | X | Shade |
|---------|-----------|---|---|-------|
| (166) | | Cl | F | " |
| (167) | | Cl | F | navy blue |
| (168) | | Cl | F | " |
| (169) | | Cl | F | navy blue |

-continued

| Example | (structure) | X | X | Shade |
|---|---|---|---|---|
| (170) | | Cl | F | " |
| (171) | | Cl | F | " |
| (172) | | Cl | F | " |
| (173) | | Cl | F | navy blue |

-continued

| Example | Structure | X | X | Shade |
|---|---|---|---|---|
| (174) | [structure with Cu complex azo dye bearing triazine with X substituents and -C(=O)-NH(CH$_2$)$_2$SO$_2$CH=CH$_2$ group] | Cl | F | blue |
| (175) | [structure: disazo dye with naphthol, SO$_3$H groups, chlorotriazine linked to phenyl-SO$_3$H and H$_2$C=HCO$_2$S(H$_2$C)$_2$HNC(=O)- group] | | | orange |
| (176) | [structure: azo dye with naphthol, SO$_3$H, chlorotriazine bearing NH$_2$, and H$_2$C=HCO$_2$S(H$_2$C)$_2$NHCH$_2$CO- group] | | | red |

-continued

| Example | | X | X | Shade |
|---|---|---|---|---|
| (177) | [structure] | | | golden yellow |
| (178) | [structure] | | | navy blue |
| (179) | [structure] | | | navy blue |
| (180) | [structure] | | | navy blue |

-continued

| Example | | X | X | Shade |
|---|---|---|---|---|
| (181) | H₂C=HCO₂S–C₆H₄–N=N–C(HO₃S)=C(NH₂)–naphthalene(OH)(SO₃H)–N=N–C₆H₃(SO₃H)–NH–[triazine(Cl)]–NH–C₆H₄–OCH₂C(=O)NH(CH₂)₂SO₂CH=CH₂ | | | navy blue |

EXAMPLE 5

1 kg of press-cake of the dye of the formula (182)

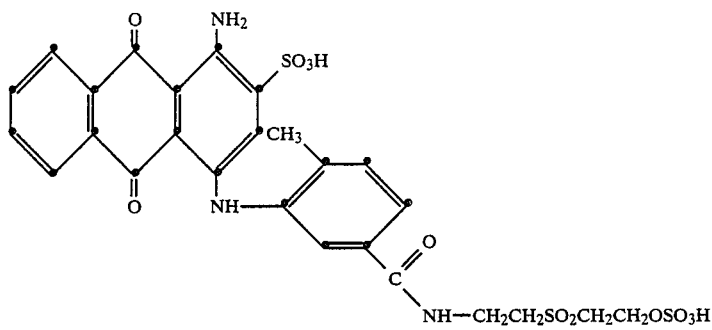

is dissolved in 5.0 l of deionized water. A solution with a content of insoluble solids of about 0.3% by weight is obtained and is subjected to microfiltration over a membrane module fitted with tubular polypropylene membranes.

The microfiltration is carried out at 40° C.; it is conducted in circulation, the entry pressure is 2 bar and the discharge pressure is 1.6 bar.

The microfiltration is ended after 2 hours. About 6 kg of a dye solution free from undissolved constituents is obtained.

The clear filtrate is then desalinated and concentrated as described in Example 1 by a two-stage reverse osmosis process.

The time required for this reverse osmosis process is 30% less in comparison with carrying out this process with a dye solution which has not been subjected to microfiltration.

About 3 kg of a concentrated dye solution with a dry substance content of 20%, the sodium chloride content of which is less than 0.2%, are obtained.

A concentrated storage-stable dye formulation, the pH of which is in the range from 3.5 to 4.5, is prepared from this solution by addition of anthraquinone-2-sulfonic acid, a dispersing agent, for example a condensation product of naphthalenesulfonic acid and formaldehyde, or caprolactam, and a little buffer substance, such as sodium acetate.

Storage-stable concentrated dye formulations can be prepared in an analogous manner from the following dyes:

(183)

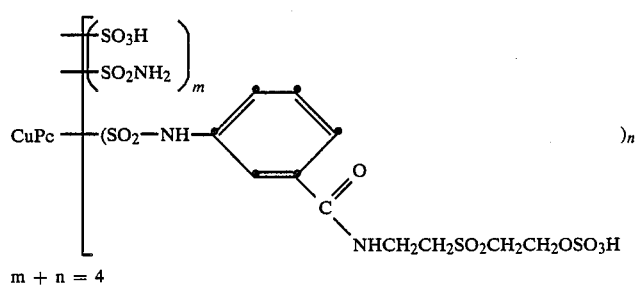

$m + n = 4$ (184)

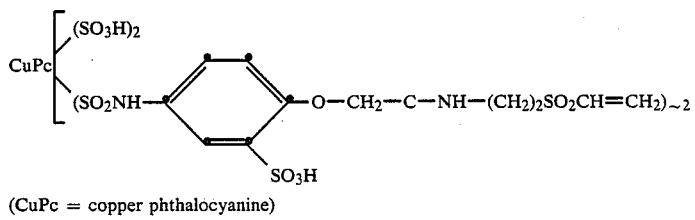

(CuPc = copper phthalocyanine)

| Example | | Shade |
|---|---|---|
| (185) | _2HN-C(=O)-H_2C-O-C_6H_3(SO_3H)-N=N-naphthol(OH)(NHCOCBr=CH_2)(SO_3H)_2) | red |

| Example | | Shade |
|---|---|---|
| (186) | H₂C=HCO₂S(H₂C)₂HN(H₂C)₂NH—C(=O)—H₂C—[phenyl]—N=N—C(=C(—N(—[phenyl]—SO₃H)—N))—C(OH)(COOH) | golden yellow |
| (187) | H₂C=HCO₂S(H₂C)HNCH₂CO(=O)—[phenyl(SO₃H)]—N=N—[naphthyl(OH)(HO₃S)(NHCO(CH₂)₃COOH)] (pH = 4) | scarlet |

EXAMPLE 6

1,500 g of filter press-cake of the dye C.I. Reactive Red 116 are dissolved in 6,000 ml of deionized water. A cloudy dye solution is obtained and is subjected to microfiltration in circulation at 45° C. over a tubular aluminium oxide membrane coated with zirconium oxide (cross-flow microfiltration).

Pore size of the membrane=0.05 μm; entry pressure=2.5 bar; discharge pressure=1.8 bar. About 0.8% by weight of insoluble solids are thereby removed. The filtration has ended after 3 hours.

The clear filtrate is then desalinated and concentrated as described in Example 1 by a two-stage reverse osmosis process. The time required for the reverse osmosis (desalination and concentration) is reduced by 70% in comparison with a trial with a dye solution which has not been prefiltered. Blocking of the membranes in the reverse osmosis is prevented by means of prefiltration, which means that the flow (flux) is increased, giving a higher profitability.

A liquid dye product which is storage-stable in the temperature range from −10° to 40° C. for at least 6 months was obtained from the desalinated concentrate after addition of customary auxiliaries, for example dispersing agents, solubilizing agents, biocides and foam suppressants, and subsequent filtration by clarification as described in Example 4.

A liquid dye product which is also storage-stable is obtained if filter press-cakes of the dye C.I. Reactive Orange 68 are used as the starting substances.

EXAMPLE 7

4,500 ml of a cloudy aqueous solution of the dye C.I. Acid Yellow 220 (dry solids content=6.2% by weight) are desalinated and concentrated as described in Example 1 by means of reverse osmosis.

The customary auxiliaries, for example dispersing agents, solubilizing agents, biocides and/or foam suppressants, required for a storage-stable liquid product are added to the desalinated dye concentrate.

The liquid formulation is subjected to cross-flow microfiltration (entry pressure=1.8 kg/cm²) in circulation over a microfiltration membrane (zirconium oxide on a carbon matrix, permeability (cut-off level) about 50,000) to remove insoluble or sparingly soluble constituents. The duration of the filtration is shortened by more than 50% in comparison with conventional static filtration methods (higher profitability). The filtrate is free from solids and is storage-stable for 6 months in the temperature range from −10° to 50° C. As a commercial dye product, it can be used directly for the preparation of dyebaths or printing pastes.

A stable dye product is also obtained by an analogous procedure using the dye C.I. Acid Blue 317.

EXAMPLE 8

5,000 g of the synthesis solution of the dye C.I. Acid Yellow 246 (dry solids content 7.5%) are subjected to cross-flow microfiltration in circulation at 60° C. over a membrane module fitted with ceramic membranes coated with aluminium oxide (diameter 4 mm) with a total area of 0.2 m². The entry pressure is 7.4 bar and the discharge pressure is 5.9 bar. 0.2% by weight of fine particles of solids are thereby removed.

The clear filtrate is then desalinated and concentrated as described in Example 1 in a further step at 50° C. by means of reverse osmosis. Without the prefiltration described here for the dye solution by means of "cross-flow microfiltration", the desalination/concentration by means of reverse osmosis would not have been possible, because the particles of solids contained in the dye solution would have blocked the reverse osmosis membrane and reduced the flux to a non-profitable level. From experience, these particles cannot be removed by conventional methods of filtration, since the filter unit is blocked by the fine particles of solids.

The customary auxiliaries, such as solubilizing agents, dispersing agents, foam suppressants, solvents and/or biocides, are added to the desalinated concentrate and the mixture is subsequently subjected to clarification by filtration. The resulting dye product is stable for at least 12 months in the temperature range fom −10° to 40° C.

Dye products of excellent stability can likewise be obtained by an analogous procedure using synthesis solutions of the dyes C.I. Acid Blue 277 and 340 or solutions containing mixtures of these dyes.

EXAMPLE 9

8,000 g of synthesis solution of the dye C.I. Direct Blue 290 (dry solids content=8.3%) are desalinated and concentrated as described in Example 1 at pH 6.5 to 7.5 and at 20° C. on a reverse osmosis unit. A concentrate with a dry substance content of 22.5%, the sodium chloride content of which is less than 0.3%, is obtained. After the dye solution thus obtained has been brought to a dry substance content of 20% by addition of water, the dye solution is filtered in circulation at 25° C. over a "cross-flow microfiltration" unit (total area=0.05 m$^2$) fitted with polypropylene membranes for the purpose of removing sparingly soluble and insoluble constituents. 0.12% by weight of solids is thereby removed. The resulting dye preparation is storage-stable in the temperature range from −10° to +40° C. for at least 6 months.

Dye products which also have an excellent stability are obtained when synthesis solutions of the following dyes are treated analogously: C.I. Direct Blue 15, C.I. Direct Blue 80, C.I. Direct Red 81, C.I. Direct Red 239, C.I. Direct Orange 29:1 and C.I. Direct Yellow 84.

What is claimed is:

1. A process for the preparation of a concentrated aqueous dye formulation of a water-soluble organic dye by desalination and concentration of a corresponding crude dye solution by means of a membrane separation process, which comprises subjecting the dye solution to cross-flow microfiltration before and/or after the membrane separation process for the purpose of removing insoluble constituents and converting it into a liquid or solid commercial form.

2. A process according to claim 1, wherein the membrane separation process is dialysis, electrodialysis, ultrafiltration or reverse osmosis.

3. A process according to claim 2, wherein the membrane separation process is carried out with a semipermeable membrane which has a pore diameter of 0.1 to 50 nm and a cut-off level in the molecular weight range from 300 to 1,000.

4. A process according to claim 1, wherein the cross-flow microfiltration is carried out with a microporous membrane, the pores of which have a diameter of 0.05 to 40 μm.

5. A process according to claim 4, wherein the microfiltration is carried out with a membrane of porous glass, ceramic, steel, coated porous carbon, aluminium oxide or an organic polymer.

6. A process according to claim 5, wherein the organic membrane-forming polymer is a polyethylene, polypropylene, polytetrafluoroethylene, cellulose acetate, polyacrylonitrile, polyvinyl alcohol, polystyrene, polysulfone, polyimide or polyamide, which may be modified chemically or physically.

7. A process according to claim 1, wherein a dye solution of a water-soluble anionic or cationic dye is subjected to the cross-flow microfiltration.

8. A process according to claim 7, wherein the dye solution has a temperature in the range from 10° to 80° C. and a pH in the range from 3 to 10.

9. A process according to claim 7, wherein the microfiltration is carried out under a pressure of 0.5 to 10 bar.

10. A process according to claim 1, wherein the dye solution is subjected to microfiltration before and after the membrane separation process.

11. The liquid or solid dye formulation obtained by the process of claim 1.

12. Method of dyeing or printing natural or synthetic textile fibers, paper or leather by employing a dye formulation of claim 11.

13. A process according to claim 2 wherein the membrane separation process is ultrafiltration or reverse osmosis.

14. A process according to claim 4 wherein the pores have a diameter of 0.1 to 40 μm.

15. A process according to claim 14 wherein the pores have a diameter of 0.2 to 10 μm.

16. A process according to claim 7 wherein a water-soluble anionic dye is subjected to cross-flow microfiltration.

17. A process according to claim 9 wherein the microfiltration is carried out under a pressure of 0.5 to 5 bar.

* * * * *